United States Patent

Verstegen

[15] 3,697,696

[45] Oct. 10, 1972

[54] METHOD FOR THE SIGNAL EXCHANGE IN TELECOMMUNICATION, PARTICULARLY TELEPHONE EXCHANGES EMPLOYING TIME-DIVISION MULTIPLEXING

[72] Inventor: Willi Verstegen, Kornwestheim, Germany

[73] Assignee: International Standard Electric Corporation, New York, N.Y.

[22] Filed: March 31, 1970

[21] Appl. No.: 24,117

[30] Foreign Application Priority Data

April 1, 1969 Germany..........P 19 16 792.1

[52] U.S. Cl. .............................................179/15 BS
[51] Int. Cl................................................H04j 3/06
[58] Field of Search.......................179/15 BY, 15 BS

[56] References Cited

UNITED STATES PATENTS 3,522,380 7/1970 Kneisel...................179/15 BS

*Primary Examiner*—Ralph D. Blakeslee
*Attorney*—C. Cornell Remsen, Jr., Walter J. Baum, Percy P. Lantzy, J. Warren Whitesel, Delbert P. Warner and James B. Raden

[57] ABSTRACT

In a PCM-switching center the signals are exchanged between the highways in those time slots in which an exchange of speech is not necessary, i.e. in which synchronizing or signalling is effected on the highways. Thus the expenditure for the exchange of signals using lumped channel-bound signalling remains relatively low. Through-signalling is accomplished by simple means.

7 Claims, 9 Drawing Figures

Figure 1:
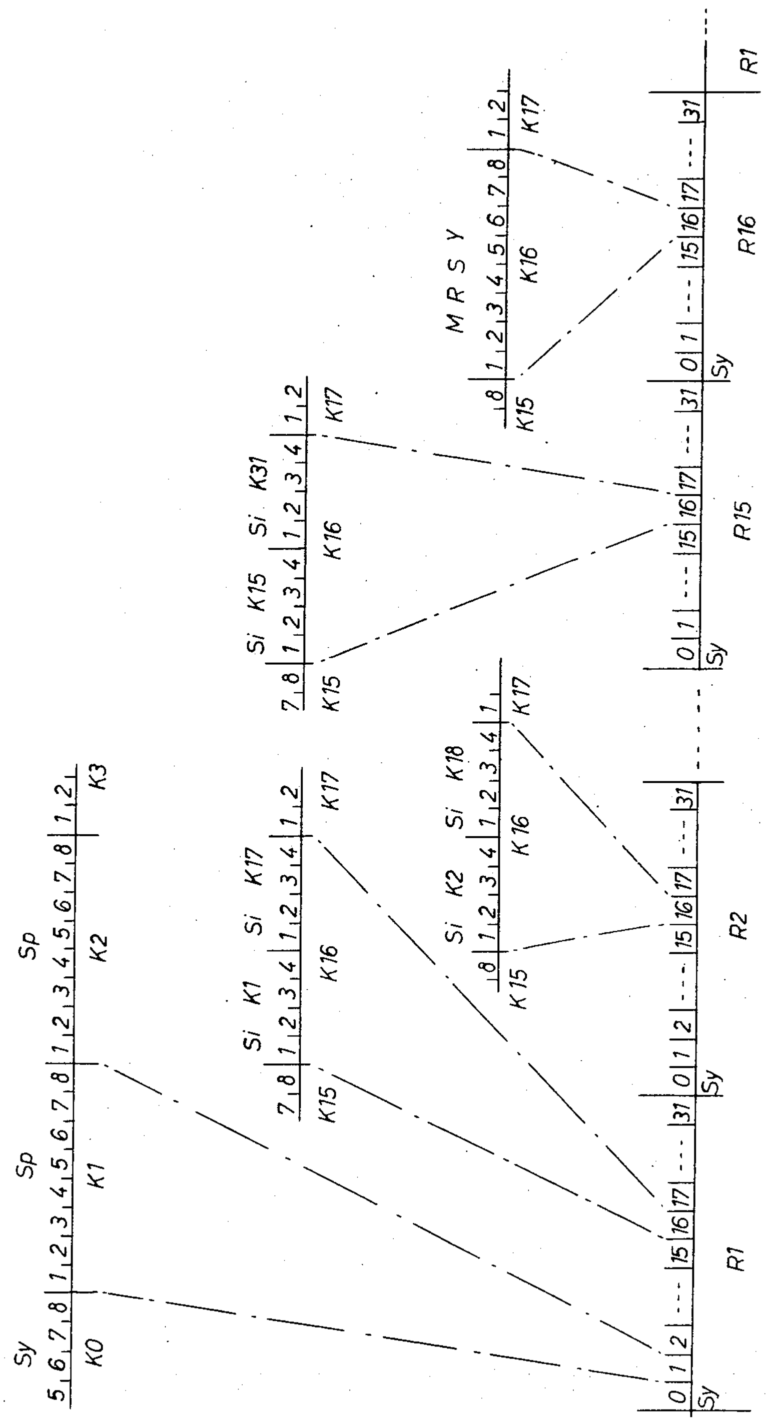

INVENTOR
W. VERSTEGEN

BY C. B. Warner
ATTORNEY

METHOD FOR THE SIGNAL EXCHANGE IN TELECOMMUNICATION, PARTICULARLY TELEPHONE EXCHANGES EMPLOYING TIME-DIVISION MULTIPLEXING

The invention relates to a method for the signal exchange in telecommunication, particularly telephone exchanges employing time-division multiplexing, in which, on the highways within a frame having several channels, there are transmitted a synchronization signal in a synchronization channel, signals for speech channels in a signalling channel, and PCM speech signals in the other channels, the signals of all speech channels being successively transmitted in the signal channels of a multi-frame.

It is the object of the invention to provide a method of controlling the signal exchange between several highways on which signalling is effected as described hereinabove. The method according to the invention is characterized in that the signals associated with the speech channels are exchanged in the time slots of the exchange at the repetition frequency of the multi-frames, in which time slots are transmitted no PCM speech signals, i.e. in those time slots in which synchronizing and signalling is effected on the outgoing PCM highways.

The method according to the invention has the advantage that the investment in the intermediate storage and through-connection of the signals remains small because of the additional utilization of the synchronization channels which are not occupied within the exchange.

For example, a method of signalling on PCM transmission paths has been proposed by the Commission of European Postal Administrations for Telephony, (CEPT), whereby within a frame having $n = 32$ channels the first channel is used for the synchronization and the seventeenth channel for signalling for, respectively, two (or four) speech channels, one multi-frame comprising 16 (or eight) frames. The invention will hereinafter be described in detail with reference to this numerical example. Since with this type of signalling, due to the time position, a permanent association exists between the signal in the signal channel of a certain frame and the respective speech channel, this signaling method is designated as channel-bound signalling on a common signalling channel or as lumped, channel-bound signalling.

With signalling on the highways being effected according to the CEPT proposal described above, the method according to the invention for an exchange employing time-division multiplexing via group and junctor memories is characterized in that the signals associated with said speech channels are temporarily stored in said group and junctor memory in a signal store read at the repetition frequency of said multi-frames, that the last lines in said group and junctor memory are associated with said signalling channels, and that of the signals, transmitted during one frame in said signalling channel and belonging to two speech channels, the signal for the one speech channel is exchanged in the time slot provided for the synchronization signal on the highway and the signal for the other speech channel is exchanged in the time slot provided for the signals on the highway, said exchange being effected between said signal stores of said group and junctor memory.

For an exchange having a multi-line group memory and a multiline junctor memory for the speech channels of several highways, another feature of the method according to the invention is characterized in that the signals are exchanged between corresponding, multi-line signal stores of said group and junctor memories, and that said signal exchange is effected in the time slots of the synchronization channel and the signalling channel of the frame, associated with the respective speech channels for signalling, on the outgoing multiplex highway and the repetition frequency of the multi-frames.

An advantageous feature of the method according to the invention for a space-time-space exchange with parallel transmission of the binary digits of a PCM speech signal from and to the junctor memory and with parallel transmission of both directions of transmission of a connection on separate wires via the same cross-point with phase-separated through-connection of the channels of a group, that correspond to each other, is characterized in that there takes place, in each time slot, a synchroneous half connection with an information, which is transmitted on in the same time slot, and an asynchrous half-connection with an information which first is preliminarily stored and then transmitted on in a different time slot Systems employing this feature generally are shown in the following U.S. patents:

1. U.S. Pat. No. 3,049,593 Touraton, et al., issued Aug. 14, 1962;
2. U.S. Pat. No. 3,281,536 Dupieux, et al., issued Oct. 25, 1966;
3. U.S. Pat. No. 3,281,537 Dupieux, et al., issued Oct. 25, 1966 and
4. U.S. Pat. No. 3,439,124 Dupieux, et al., issued Apr. 15, 1969.

For a space-time-space exchange with parallel transmission of the binary digits of a PCM speech signal from and to the junctor memory during one bit period and with phase-separated through-connection during one channel period, of both directions of transmission of one channel and of the channels of a group, that correspond to each other, the method according to the invention is characterized in that the binary digits of the signals are likewise connected through in parallel, in each case during one bit period of that particular signal channel or synchronization channel of the frame, which is associated with the outgoing speech channel in the group memory for the transmission of the signals.

The method may be modified in such a manner that the binary digits of a signal are connected through serially on one line and that to this end, several signals of different highways are simultaneously connected through in a space division.

Figure 2A:
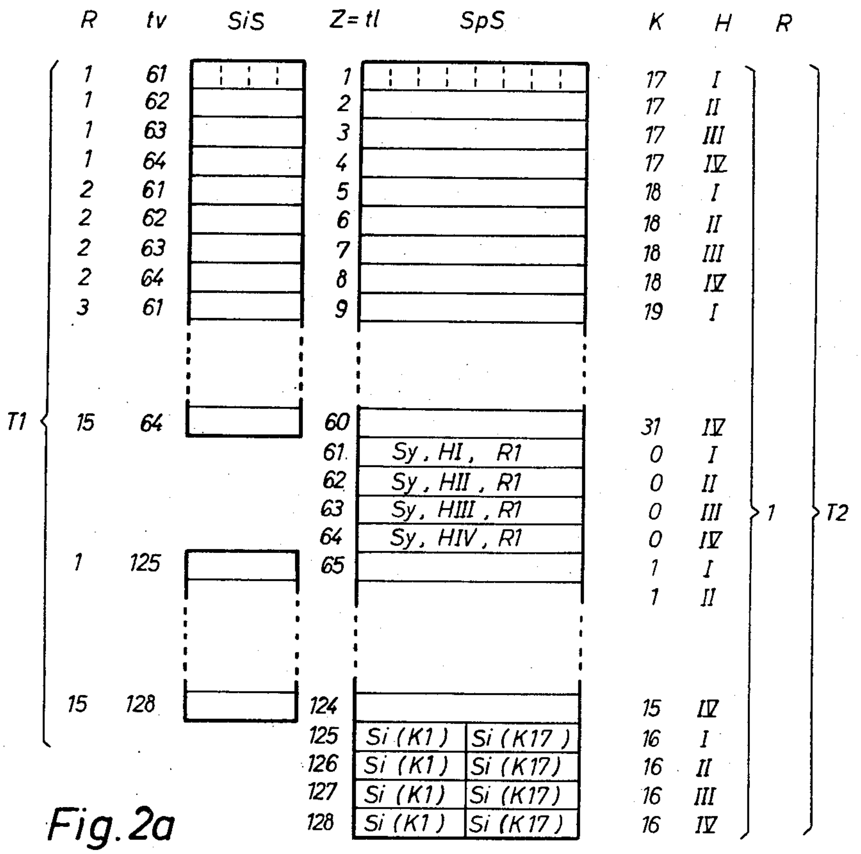
Figure 2B:
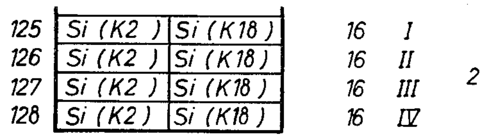
Figure 2C:
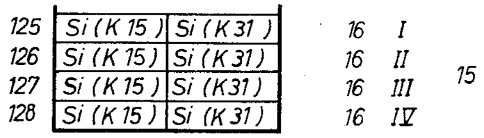
Figure 2D:
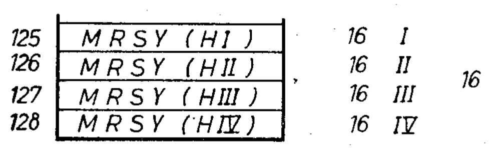

A further feature of the invention is characterized in that, during the establishment of a connection, the incoming signals for one channel are scanned and evaluated in the corresponding synchronization or signal channel of the frame, which is occupied for the signal transmission for the incoming speech channel and that, for through-signalling after the occupation of an on-leading speech channel, the signals are exchanged in said synchronization or signal channel of the frame intended for signalling for the on-leading speech channel. The invention will now be explained by reference to the following description of an embodiment thereof taken in conjunction with the accompanying drawings in which:

FIG. 1 is a timing diagram illustrating the distribution of a multi-frame on a PCM transmission path according to proposal of the CEPT;

FIG. 2*a* shows the distribution of a group memory with a partial statement of the contents after the end of the first frame;

FIG. 2*b* shows the contents of the last memory lines of the group memory according to FIG. 2*a* after the end of the second frame;

FIG. 2*c* shows the contents of the last memory lines after the end of the sixteenth frame;

FIG. 2*d* shows the frame synch signal write-in.

Figure 3:
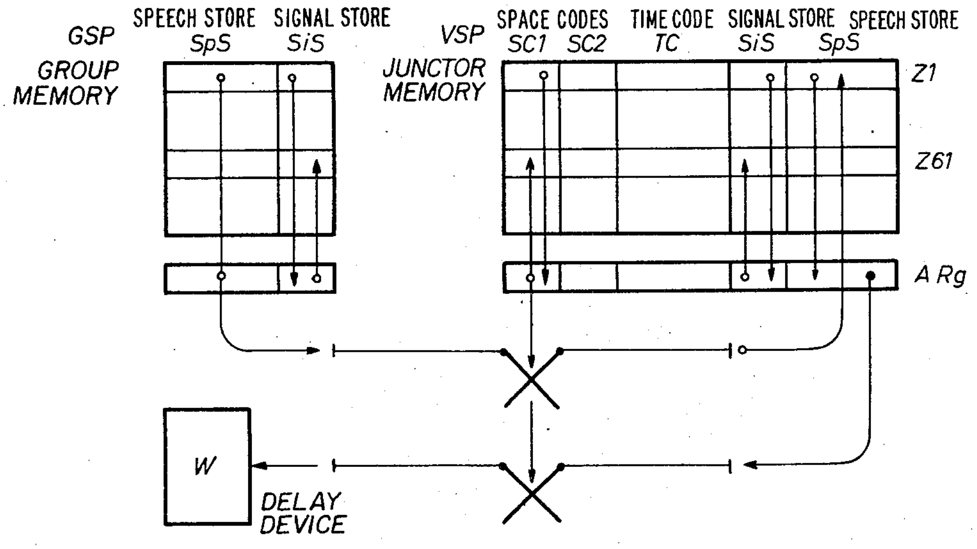
Figure 4:
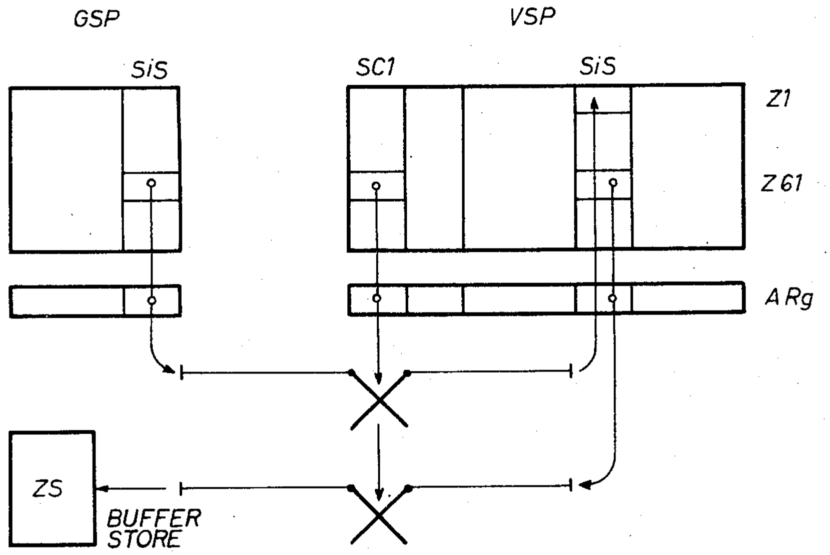
Figure 5:
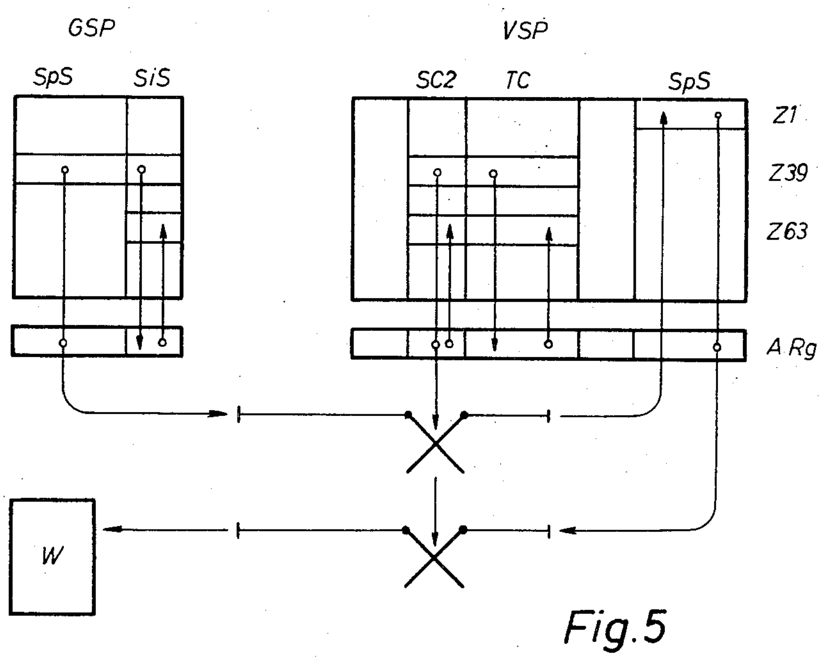
Figure 6:
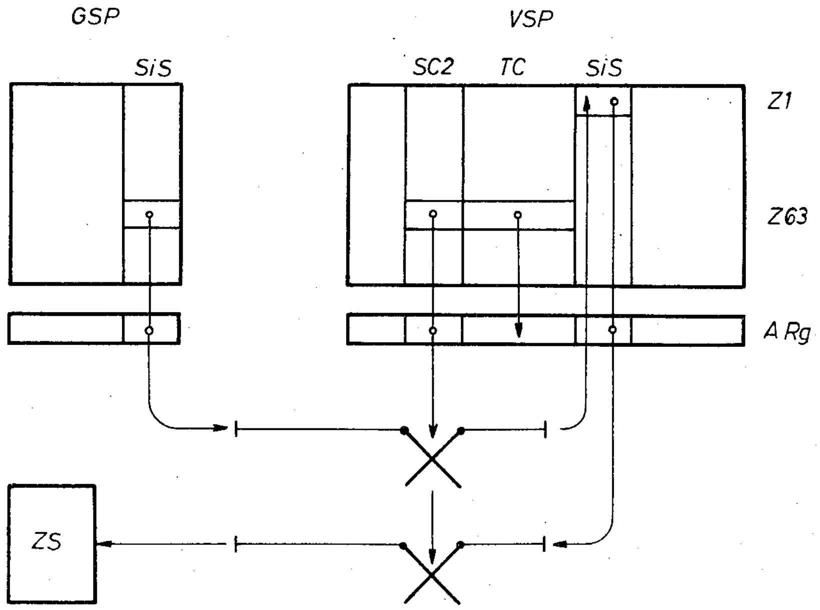

FIG. 3, in one embodiment, shows a first half-connection between a group memory and a junctor memory in the first frame during a time slot 1;

FIG 4 shows the continuation of the first half-connection according to FIG. 3 for the signals during the time slot 61;

FIG. 5, referring to the embodiment shown in FIG. 3, shows the establishment of a second half-connection between the junctor memory and the group memory in the tenth frame during a time slot 39;

FIG. 6 shows the continuation of the second half-connection according to FIG. 5 for the signals during a time slot 63. The timing diagram according to FIG. 1 comprises one multi-frame with sixteen frames R1 to R16. Each frame comprised 32 channels K0 to K31, the channels K1 to K15 and K17 to K31 being intended for the transmission of a synchronization signals Sy and the channel K16 for signalling. The synchronization signal Sy and the PCM speech signals Sp consist of eight binary digits 1 to 8 each. In the channel K16, there can in each case be transmitted two signals for two different speech channels, each signal having four binary digits 1 to 4. Therefore, 15 signal channels K16 are required for 30 speech channels, the signals SiK1 and SiK17 for the speech channels K1 and K17 being transmitted in the channel K16 of the first frame, the signals SiK2 and SiK18 for the speech channels K2 and K18 being transmitted in the channel K16 of the frame R2, and the signals SiK15 and SiK31 for the speech channels K15 and K31 being transmitted in channel K16 of the frame R15. In the channel K16 of the frame R16, e.g. a frame synchronization signal MRSY can be transmitted. When the information repetition frequency for the speech channels is 8 KHz, which corresponds to a scanning period of 125 $\mu$s, the repetition frequency of the signals for one speech channel is 500 Hz, which corresponds to a scanning period of 2 ms.

The group memory according to FIG.2*a* consists of a speech store SpS and a signal store SiS. In the example shown, the information of four highways HI to HIV is preliminarily stored in this group memory. The scanning period T2 for the speech store SpS is 125 $\mu$s, and the scanning period T1 for the signal store SiS is 2 ms. It is assumed that this group memory is an input memory in which the eight binary digits of the PCM speech signals are simultaneously written into the respective line and switched through in parallel. In this case, the line number Z of the speech store SpS corresponds to the relative reading time t1. After the end of the first frame R1, the received PCM speech signal of the channel K17 of the first highway HI has been read into the line 1 of the speech store SpS. In the line 2 appears the PCM speech signal of the channel K17 of the second highway HII, hereinafter referred to as "-word K17 HII"; whenever necessary, this designation will, for the purpose of distinction, be supplemented by the designation of the frame, e.g., frame R1. Accordingly, the word K18 HI appears in line 5, the word K19HI in line 9, the word K31 HIV in line 60, the word K1HI in line 65, and the word K15HIV in line 124. In the line 61 to 64 of the speech store appear the synchronization signals Sy of the four highways HI to HIV, whose significance and evaluation are not explained here; in any case, the synchronization signals are not switched through. The time slots 61 to 64 and 125 to 128 are available for the exchange of the signals. If desired, the signals received in the sixteenth channel of the highways can be written into the lines 125 to 128 of the speech store. According to the explanations given in connection with FIG. 1, these are, in the first frame R1, the signals SiK1 and Sik17 of the first and the seventeenth channel.

The signal store SiS also contains signals for all four highways HIV. However, as mentioned hereinbefore, writing and reading are effected at alower repetition frequency. The lines 1 to 4 and 65 to 68 are written simultaneously with the lines 125 to 128 of the speech store in the first frame R1 only. Accordingly, the lines 5 to 8 and 69 to 72 are written only in the second frame R2, and the lines 57 to 60 and 121 to 124 are written only in the fifteenth frame R 15. In FIG. 2*a*, a special column specifies the exchange time slot *tv* for the signals. The signals of the channels K17 to K31 are in each case switched through in the frame, already allocated to the transmission, during the time slots 61 to 64, and the signals of the channels K1 to K15 are switched through in the time slots 125 to 128. The sequence is interchangeable. Thus the time slots 61 to 64 and 125 to 128, which are not required for the exchange of speech signals, are utilized. In each frame, the signals for two speech channels are exchanged.

FIG. 2*b* shows that, in the frame R2, the signals SiK2 and SiK18, which are transmitted in the channel K16, are written into the lines 125 to 128 of the speech store.

FIG. 2*c* shows that, in the frame R15, the signals SiK15 and SiK31, which are transmitted in the channel K16, are written into the lines 125 to 128.

FIG. 2*d* shows that, in the frame R16, the frame synchronziation signal MRSY, which is transmitted in the channel K16, is written into the lines 125 to 128. This signal is not written into the signal store SiS according to FIG.2*a*, but synchronizes a frame counter which is required for the writ-in control of the signal store SiS according to FIG.2*a*.

An example of a existing connection in a space-time-space switching network will now be explained in detail with reference to the FIGS. 3 to 6. In this case, a call is connected through from a group memory GSP via a junctor memory VSP to the same or another highway in the group memory GSP.

At first, the organization of the junctor memory VSP will be explained with the aid of FIG.3. In the first two columns of the junctor memory VSP two space codes SC1, SC2 are stored, which state via which space crosspoints the channels to be connected are transmitted. The space crosspoint to be closed is determined by means of these space codes. In the middle column of the junctor memory VSP, a time code TC is stored, which determines the line of the speech and signal store SiS and SpS, respectively, of the junctor memory VSP, which line is to be read and overwritten in the asynchronous half-connection. In the two right columns, the junctor memory VSP, in the same way as the group memory, contains a signal store SiS and a speech store SpS. Just as the group memory, the junctor memory VSP has 128 lines, of which only the lines Z1 and Z61 are shown in FIG.3. The group memory GSP has already been described in detail in conjunction with FIG.2*a*. FIG.3 also shows that both the group memory GSP and the junctor memory VSP have an output register ARg, in which the line contents, which are read in a cycle, are made available for the transmission.

A connection between the channel 17 on the highway HI and the channel 26 on the highway HIII will be described in the following:

FIG.3 shows the processes in the first frame during the time slot 1. The line Z1 of the group memory GSP is associated with the channel 17 of the highway HI. The line Z1 of all memories is read during the time slot 1. The speech information is transmitted from the line Z1 of the speech store SpS in the group memory GSP via the output register and the symbolically illustrated space switching stage to the line Z1 of the speech store SpS in the junctor memory VSP. The crosspoint which must be operated for this purpose is determined by the space code SC1 of the synchronous half-connection. The speech information of the opposite direction takes the opposite course from the speech store Sps of the junctor memory VSP via the output register ARg and the space switching stage. However, this information is preliminarily stored only shortly in a delay device W only for a short period because the channel 17 is to be sent at that moment on all outgoing highways.

While the speech is transmitted during the time slot 1 of each frame, the signal and the space code SC1 are written into the line Z61 only if a frame counter (not shown) for the outgoing highways indicates the frame R1.

The lines Z2 to Z4 with information of other connections are, in the time slots 2 to 4, treated just as the line 1, with the exception that the signal information is written into the respective lines 62 to 64.

In the time slots 5 to 60, only the speech information of the respective half connections are exchanged in the first frame R1.

FIG.4 shows for the same connection the processes during the time slot 61 in the first frame. During this time slot, the same crosspoint as during the time slot 1 is closed due to the space code SC1 in the line Z61 of the junctor memory VSP. From the line Z61 of the signal store SiS in the group memory GSP, the signal information reaches the line Z1 of the signal store SiS in the junctor memory VSP via the output register of the groupmemory GSP and the space switching stage because the frame counter still indicates the first frame.

From the line Z61 of the signal store SiS in the junctor memory VSP, the signal information of the opposite direction reaches a buffer store ZS via the output register ARg of the junctor memory VSP and the space switching stage because in the time slot 61 the synchronization signal is being sent at that moment on all outgoing highways in the channel KO and no signalling is being effected. In the time slots 61 to 64 four buffer stores are required therefor, which release their information in the time slots 125 to 128 only if signalling is effected on the outgoing highways in the channel K16.

FIG.5 shows the processes for the same connection in the time slot 39 of the tenth frame. In the time slot 39, the time code TC in the line Z39 of the junctor memory VSP states that the speech information of the calling channel K17 can be found in the line Z1, and that the speech information of the calling channel K26 of the highways HIII, with which channel is associated the line Z39, is to be written into the line Z1. The space code SC2 determines the crosspoint of this asyncronous half-connection, which is to be closed. The speech information from the line Z1 of the speech store SpS in the junctor memory VSP reaches the delay device W via the output register ARg of the junctor memory VSP and the space switching stage. There, it is preliminarily stored for a short period because during the time slot 39 the speech information of the channel K26 is to be transmitted on the highway HIII. From the line Z39 of the speech store SpS in the group memory GSP, the speech information of the opposite direction reaches the line Z1 of the speech store SpS in the junctor memory VSP via the output register of the group memory GSP and the space switching stage.

The signals for the speech channel K26 are transmitted on the outgoing highway in the tenth frame in the channel K16. Since, as assumed hereinabove, the frame counter indicates the tenth frame at that moment, the line Z63 of the junctor memory VSP is overwritten with that portion of the line Z39, which contains the space code SC2 and the time code TC. The signal stored in the line Z39 of the signal store SiS in the group memory GSP is preliminarily stored in the line Z63 of the same store until it can be passed on in the time slot 63.

FIG.6 shows for the same connection the processes in the time slot 63. In the line Z 63 of the junctor memory VSP, the time code TC states that the signal information to be transmitted is to be taken from the line Z1 or written into said line.

The space code SC2 in line Z63 of the junctor memory VSP determines the crosspoint to be closed. The signal information from the line Z1 of the signal store SiS in the junctor memory VSP reaches the buffer store ZS already mentioned in connection with FIG.4 via the output register of the junctor memory VSP and the space switching stage because, as already mentioned there, synchronizing and no signalling is effected in the time slots 61 to 64.

The preliminarily stored signal information is passed on in the time slot 127. In the opposite direction, the signal information reaches the line Z1 of the signal store SiS in the junctor memory GSP from the line Z63 of the signal store SiS in the group memory via the output register of the group memory and the space switching stage.

In each time slot, a synchronous and an asynchronous half-connection takes place. The control method according to the invention can be used in a similar manner in an exchange having time-space-time switching stages.

The preliminary storage of the signals in the lines 61 to 64 and 125 to 128 is not necessary if the group and junctor memories are, for the purpose of reading and overwriting, addressed in the time slots 61 to 64 and 125 to 128 with the respective position of the frame counter of the outgoing PCM highways and the space code, so that e.g., during the time slot 61 it is not the line 61 which is read or overwritten, but in the first frame the first line of the signal store of the group memory and the first line of the junctor memory.

What is claimed is:

1. Method for the signal exchange in telecommunication, particularly telephone exchange time-division multiplexing, in which, on the highways within a frame having several channels, the steps of transmitting a synchronization signal in a synchronization channel, transmitting signals for speech channels in a signalling channel, and transmitting PCM speech signals in the other channels, and successively transmitting in the signal channels of a multi-frame, the signals of all speech channels the inventive steps being the exchanging of the signals associated with the speech channels in the time slots of the exchange at the repetition frequency of the multi-frames, to those time slots in which synchronizing and signalling is effected on the outgoing PCM highways.

2. Method according to Claim 1, for an exchange, in which a frame 32 channels, and in which in each frame the first channel is used for synchronizing and the seventeenth channel for signalling for two speech channels, one multi-frame comprising 16 frames, employing time-division multiplexing via group and junctor memories, characterized in the steps of temporarily storing the signals associated with said speech channels in said group and junctor memory in a signal store read at the repetition frequency of said multi-frames, associating the last lines in said group and junctor memory with said signalling channels, and that of the signals, transmitted for two speech channels in one signalling channel, exchanging the signal for the one speech channel in the time slot provided for the synchronization signal on the highway and exchanging the signal for the other speech channel in the time slot provided for the signals on the highway, said exchange being effected between said signal stores of said group and junctor memory.

3. Method according to claim 2, for an exchanging a multi-line group memory and a multi-line junctor memory for the speech channels of several time-division multiplex highways, characterized in the steps of exchanging the signals between corresponding, multi-line signal stores of said group and junctor memories and that said signal exchange is effected in the time slots of the synchronization channel and the signalling channel of the frame, associated with the respective speech channels for signalling, on the outgoing multiplex highway and the repetition frequency of the multi-frames.

4. Method according to claim 3 for a space-time-space telecommunication exchange with parallel transmission of the binary digits of a PCM speech signal from and to the junctor memory and with parallel transmission of both direction of transmission on separate wires via the same crosspoint with phase-shifted through-connection of the channels of a group, which corresponds to each other, characterized in the steps of performing in each time slot, a synchronous partial connection with an information, which is transmitted on in the same time slot, and an asynchronous partial connection with an information which first is preliminarily stored and then transmitted on in a different time slot to complete a connection transmittal of information through said partial connections.

5. Method according to claim 3 for a space-time-space exchange with parallel transmission of the binary digits of a PCM speech signal from and to the junctor memory during a bit period and phase-shifted through-connection of both directions of transmission of a channel and the channels of a group, which correspond to each other, during a channel period, characterized in the step of connecting the binary digits of the signals through in parallel during one bit period of that particular signal channel or synchronization channel of the frame, which is associated with the outgoing speech channel in the group memory for the transmission of the signals.

6. Method according to claim 3, characterized in that during the establishment of a connection, the added steps of scanning and evaluating the incoming signals for one channel in the corresponding synchronization or signal channel of the frame, which is occupied for the signal transmission for the incoming speech channel and that, for through-signalling after the occupation of an on-leading speech channel, the final step of exchanging the signals in said synchronization or signal channel of the frame intended for signalling for the on-leading speech channel.

7. Method according to claim 6, characterized in the step of addressing the group and junctor memories for the purpose of reading and overwriting in the synchronization and signalling time slots, respectively with the respective position of the frame counter of the outgoing PCM highways and the time code, so that e.g. in the 61st time slot it is not the 61st line which is read or overwritten, but in the first frame the first line of the signal store of the group memory and the junctor memory.

* * * * *